United States Patent [19]

Wang et al.

[11] 4,255,666

[45] Mar. 10, 1981

[54] TWO STAGE, PANEL TYPE X-RAY IMAGE INTENSIFIER TUBE

[75] Inventors: Shih-Ping Wang, Los Altos; Charles D. Robbins, Los Altos Hills, both of Calif.

[73] Assignee: Diagnostic Information, Inc., Sunnyvale, Calif.

[21] Appl. No.: 18,127

[22] Filed: Mar. 7, 1979

Related U.S. Application Data

[63] Continuation-in-part of Ser. No. 885,169, Mar. 10, 1978.

[51] Int. Cl.[3] .......... H01J 31/50; G01T 1/00; G01T 1/20

[52] U.S. Cl. .......... 250/486; 250/213 VT; 250/368

[58] Field of Search .......... 250/320, 213 VT, 363 S, 250/361 R, 486, 487, 488, 213 R, 368

[56] References Cited

U.S. PATENT DOCUMENTS

| | | | |
|---|---|---|---|
| 2,739,257 | 3/1956 | Sheldon | 250/487 |
| 2,739,258 | 3/1956 | Sheldon | 250/488 |
| 3,023,313 | 2/1962 | De La Mater et al. | 250/487 |
| 3,683,185 | 8/1972 | Muehllehner | 250/213 VT |
| 3,838,273 | 9/1974 | Cusano | 250/213 VT |
| 4,020,376 | 4/1977 | Bosserman et al. | 250/213 R |
| 4,104,516 | 8/1978 | Wang et al. | 250/213 VT |
| 4,140,900 | 2/1979 | Wang | 250/213 VT |
| 4,142,101 | 2/1979 | Yin | 250/483 |

FOREIGN PATENT DOCUMENTS

| | | | |
|---|---|---|---|
| 1147384 | 4/1969 | United Kingdom | 250/361 |

OTHER PUBLICATIONS

Muehllehner, "Image Intensifier Scintillation Cameras for Nuclear Medicine Applications", SPIE, vol. 78, 1976, Low Light Level Devices, pp. 113–117.

*Primary Examiner*—Alfred E. Smith
*Assistant Examiner*—Carolyn E. Fields
*Attorney, Agent, or Firm*—Limbach, Limbach & Sutton

[57] ABSTRACT

A panel shaped, proximity type, multi-stage x-ray image intensifier tube for medical x-ray diagnostic use having all linear components and yet a high brightness gain, the tube being comprised of a rugged metallic tube envelope, an inwardly concave, metallic input window, a full size output display screen, a planar, activated alkali-halide scintillator photocathode screen, a fiberoptic plate between the scintillator-photocathode screen and the output display screen, the plate having an intermediate display screen on one flat side facing the scintillator-photocathode screen and a second photocathode on the otherside, which faces the output display screen, and with the scintillator-photocathode screen and the fiber-optic plate being suspended on insulators within the envelope and in between the input window and the output screen. Separate, high, negative electrostatic potentials are applied between the scintillator-photocathode screen and the intermediate display screen and between the second photocathode and the output display screen. The tube can be used in a direct view, photofluorographic mode, in a radiographic camera system and with a remote view T.V. system.

12 Claims, 5 Drawing Figures

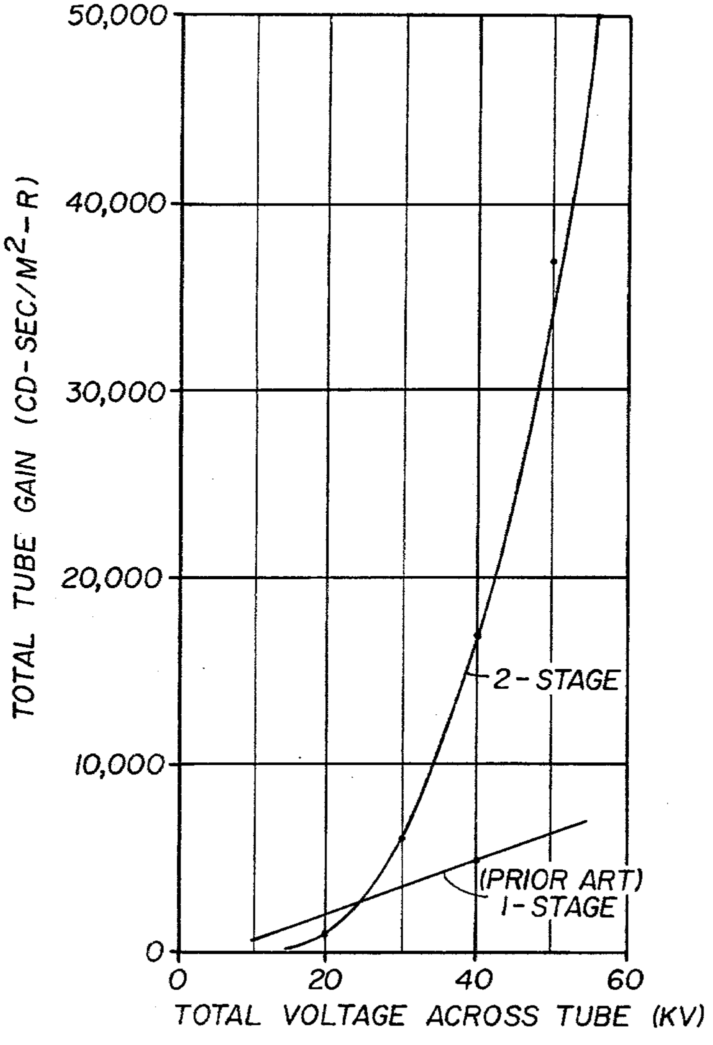
FIG.__5.

TWO STAGE, PANEL TYPE X-RAY IMAGE INTENSIFIER TUBE

CROSS REFERENCE TO RELATED APPLICATION

This application is a continuation-in-part of our co-pending application, Ser. No. 885,169 entitled GAMMA RAY CAMERA, filed Mar. 10, 1978 and is related to U.S. Pat. No. 4,140,900, issued Feb. 20, 1979, and entitled PANEL TYPE X-RAY IMAGE INTENSIFIER TUBE AND RADIOGRAPHIC CAMERA SYSTEM.

BACKGROUND OF THE INVENTION

This invention pertains to medical x-ray apparatus, and more particularly to an x-ray image intensifier tube of the proximity type for medical x-ray diagnostic use.

In U.S. Pat. No. 4,140,900 a proximity type image intensifier tube is described. The device uses all linear components and has a high brightness gain. It also has several constructional advantages which contribute to its safety in use, as explained in greater detail in the patent. One disadvantage, however, of the device is that its gain is limited to about 5,000 cd - sec/$m^2$ - R for high resolution, high contrast applications.

The present applicants have found that many factors contribute to this limitation. Brightness gain in the single stage tube of the type described in U.S. Pat. No. 4,140,900 is proportional to the spacing between the scintillator-photocathode screen and the output phosphor display screen and to the accelerating electrostatic potential applied between them. Wider spacing and higher potential, although producing a higher gain, also reduce the contrast ratio and the resolution.

The reduction in contrast ratio is believed to be due to certain feedback mechanisms operating within the tube. One of these feedback mechanisms is that electrons which strike the output phosphor display screen are, in some cases, reflected back and then are reaccelerated back to the phosphor display screen to strike it again at a different location, thereby reducing both the contrast and the resolution. Also light which is transmitted through the aluminum backing layer on the display screen strikes the photocathode, which produces corresponding electrons, which are then accelerated to strike the phosphor display screen and again reduce the contrast as well as the resolution. Still another feedback mechanism is that because of the high acceleration applied to the electrons traveling from the scintillator-photocathode screen, when the electrons strike the phosphor display screen they produce ions and x-rays which can find their way back to the scintillator and produce unwanted "noise" in the image signal.

Part of the resolution problem is that the scintillator-photocathode surface is relatively rough due to the method (vapor deposition) by which the scintillator material is applied to the support surface. This produces a rough photocathode surface which emits electrons in a relatively wide dispersion. This dispersion is aggrevated as the distance between the scintillator-photocathode screen and the output phosphor display screen is increased.

Originally it was thought that simply increasing the gain would not solve these problems but, on the contrary, would merely aggrevate the problem.

SUMMARY OF THE INVENTION

The above disadvantages of a single stage proximity type image intensifier tube were overcome by the applicant's invention which yield a much higher gain with even better contrast ratio and resolution than a single stage type tube.

The multi-stage image intensifier tube according to applicant's invention comprises a flat scintillator screen, an output display screen and multi-stage light amplification means intermediate the scintillator screen and the output display screen. The multi-stage light amplification means include at least a first flat photocathode exposed with its flat surfaces parallel to and adjacent to the scintillator screen, and an intermediate flat phosphor display screen, the display screen having its flat surfaces parallel to and spaced apart from the flat surfaces of the photocathode and on its side opposite from the scintillator screen. This constitutes a first light amplification stage of the image intensifier tube. A second light amplification stage of the tube includes a fiberoptic plate, a second photocathode, and the output phosphor display screen. The intermediate display screen, that is the display screen of the first stage, is mounted on one side of the fiberoptic plate and the second photocathode, which together with the output phosphor display screen constitutes the second stage, is mounted on the other side of the fiberoptic plate. The output display screen is spaced apart from the second photocathode and plane parallel to it. Means are provided for applying an accelerating electrostatic potential between the first display screen and the first photocathode and for applying an accelerating electrostatic potential between the intermediate display screen and the output display screen. An open ended, hollow, evacuated envelope surrounds the scintillator screen, the fiberoptic plate, the first and second photocathodes, intermediate and output display screens, and is closed at one end by a glass output window and at the opposite end by a concave metallic input window.

In the preferred embodiment the tube envelope is metal and the electrostatic potential means supply high negative potentials to the scintillator screen, the first and second photocathodes, and a ground potential to the second display screen and the envelope.

The scintillation screen, the first and second photocathodes and the first and second display screens have substantially the same diagonal dimensions so that full size x-ray images may be intensified, as opposed to the minified images of some prior art non-proximity type image intensifier tubes. Moreover these diagonal dimensions are at least equal to the actual size of the x-ray image to be intensified. The electrostatic potentials applied between the photocathode and the display screen of each stage accelerate the photoelectrons produced at the photocathodes toward the display screens along essentially parallel, straight trajectories to impinge on the display screens. It is these features of the invention which are referred to by the term "proximity image intensifier" as used herein to distinguish over prior art image intensifying devices which minify, use magnetic or electrostatic focusing, or use active intermediate, non-linear components such as multichannel plates, which do not pass photoelectrons along straight lines.

In the preferred embodiment the scintillator screen is a furnace grown scintillator crystal or vapor deposited polycrystalline screen selected from the group consisting essentially of CsI(Na) or NaI(Tl). Some embodiments further include a barrier layer interposed between the scintillator crystal and the photocathode. The barrier layer is transparent and has an index of refraction which matches the index of refraction of the scintillator crystal. The barrier layer is made of a material selected from the group consisting essentially of CsI(Na), CsI, bismuth germanate or $Al_2O_3$.

In the preferred embodiment the spacing between the first photocathode and the first display screen is preferably 10 mm although in some embodiments the spacing may range between 5 mm to 15 mm. The spacing between the second photocathode and the second display screen is preferably 15 mm in the preferred embodiment however in other embodiments the spacing may vary between 10 mm and 25 mm. The electrostatic potential which is applied between the first photocathode and the first display screen is preferably 20,000 volts however in other embodiments it could range from 10,000 to 30,000 volts. The potential which is applied between the second photocathode and the second display screen is preferably 30,000 volts although in other embodiments it could range between 20,000 to 40,000 volts.

In the preferred embodiment the envelope is metal and the electrostatic potential means supply high negative potentials to the scintillator screen and the first and second photocathodes and a ground potential to the second display screen and the tube envelope. An intermediate potential is, of course, supplied to the first display screen.

It is therefore an object of the present invention to provide an improved proximity type x-ray image intensifier tube having both high gain and good resolution.

It is still another object of the invention to provide an improved panel type x-ray image intensifier tube having high gain and a high contrast ratio.

It is a further object of the invention to provide a high gain x-ray image intensifier tube which is safe in its operation.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 5 is a graph comparing the total tube gain as a function of applied voltage for the present invention versus a prior art, single stage tube.

DETAILED DESCRIPTION OF THE PREFERRED EMBODIMENT

Figure 1:
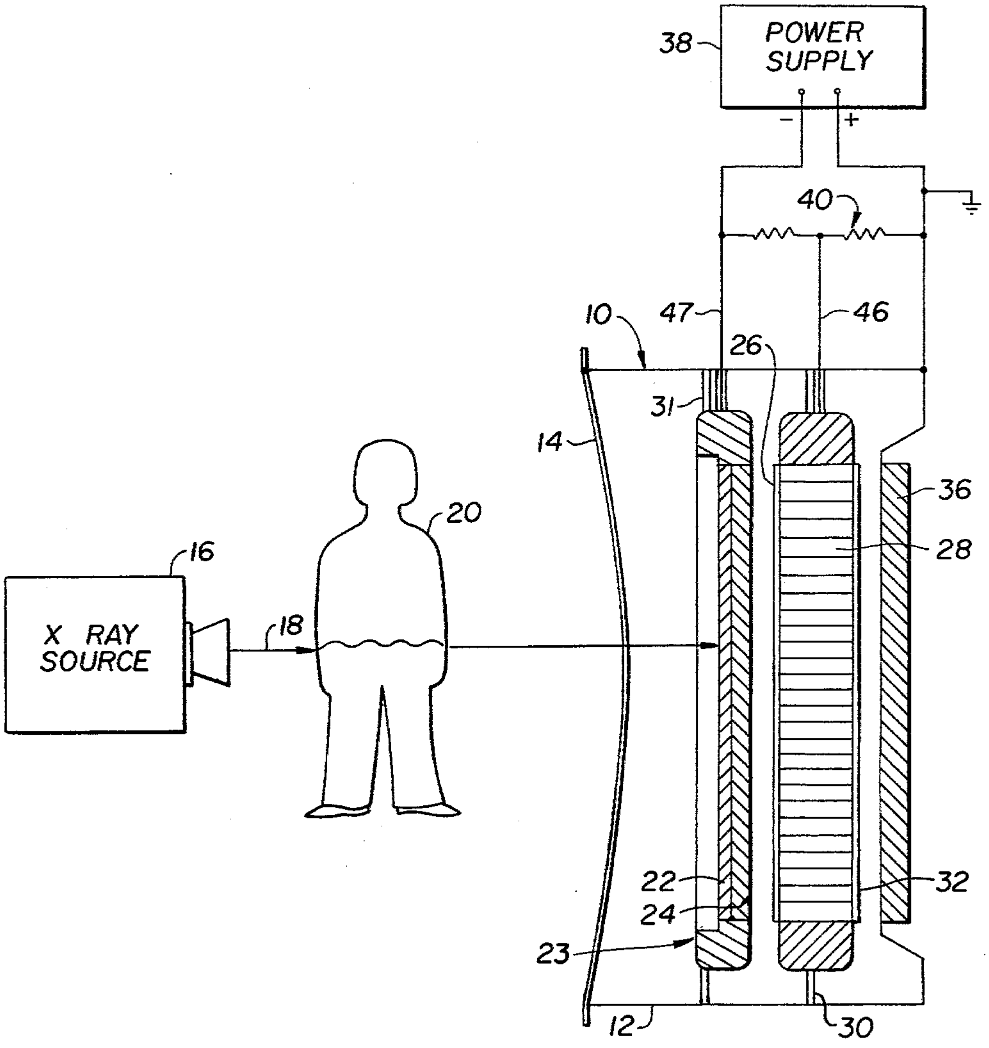
FIG. 1 is a diagrammatic illustration of the two stage proximity image intensifier tube according to the invention.
Figure 2:
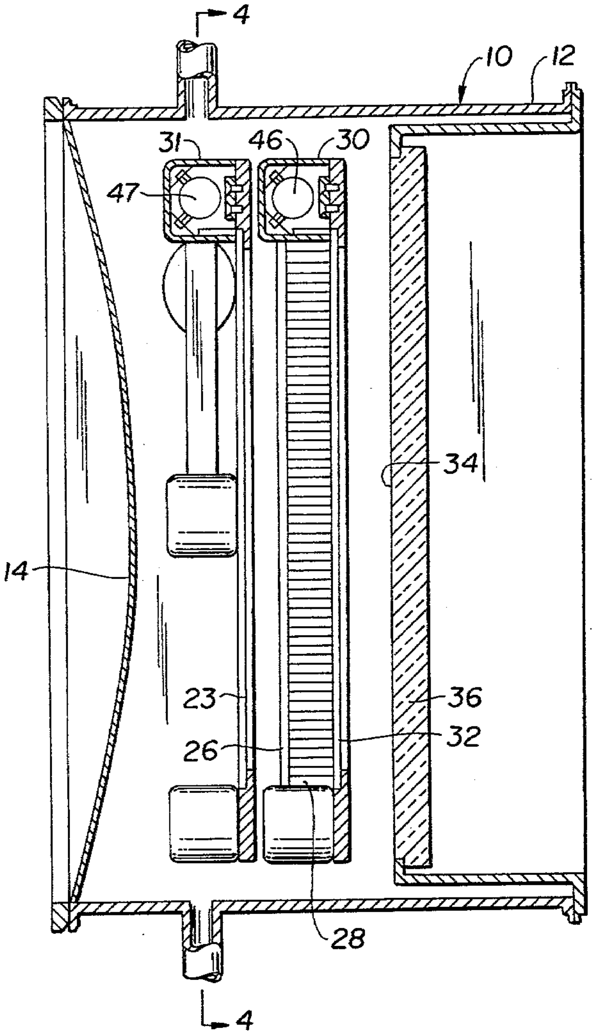
FIG. 2 is a vertical, sectional view of the image intensifier tube of the invention.

Referring to FIGS. 1 and 2, a panel shaped proximity type x-ray image intensifier tube 10 according to the invention is illustrated. The image intensifier tube 10 comprises a metallic, typically type 304 stainless steel, vacuum tube envelope 12 and a metallic, inwardly concave input window 14. The window 14 is made of a specially chosen metal foil or alloy metal foil in the family of iron, chromium, and nickel, and in some embodiments, additionally combinations of iron or nickel together with cobalt or vanadium. It is important to note that these elements are not customarily recognized in the field as a good x-ray window material in the diagnostic region of the x-ray spectrum. By making the window thin, down to 0.1 mm in thickness, the applicant was able to achieve high x-ray transmission with these materials and at the same time obtain the desired tensile strength. In particular, a foil made of 17-7 PH type of precipitation hardened chromium-nickel stainless steel is utilized in the preferred embodiment. This alloy is vacuum tight, high in tensile strength and has very attractive x-ray properties: high transmission to primary x-rays, low self-scattering, and reasonably absorbing with respect to patient scattered x-rays. The window 14 is concaved into the tube like a drum head.

The use of materials which are known for high x-ray transmission such as beryllium, aluminum and titanium for example cause the undesirable scattering which is present in some prior art proximity type, x-ray image intensifier devices.

One purpose of having a metallic window 14 is that it can be quite large in diameter with respect to the prior art type of convex, glass window without affecting the x-ray image quality. In one embodiment, the window measures 0.1 mm thick, 25 cm by 25 cm and withstood over 100 pounds per square inch of pressure. The input window can be square, rectangular, or circular in shape, since it is a high tensile strength material and is under tension rather than compression.

In operation, an x-ray source 16 generates a beam of x-rays 18 which passes through a patient's body 20 and casts a shadow onto the face of the tube 10. The x-ray image passes through the window 14 and impinges upon a flat scintillation screen 22 which converts the image into a light image. This light image is contact transformed directly to an immediately adjacent, first flat photocathode screen 24 which converts the light image into a pattern of electrons. The scintillator and photocathode screens 22 and 24 comprise a complete assembly 23.

A first or intermediate phosphor display screen 26 is mounted on one face of a fiberoptic plate 28 which is suspended from the tube envelope 12 by means of insulators 30. On the opposite face of the fiberoptic plate 28 a second photocathode 32 is deposited. The fiberoptic plate 28 is oriented in a plane parallel to the plane of the first scintillation screen 22.

A second or output phosphor display screen 34 is deposited on an output window 36. A high voltage power supply 38 is connected between the first phosphor display screen 26 and the first photocathode 24 as well as between the second photocathode 32 and the second phosphor display screen 34. The power supply is biased through a resistance divider 40 such that the potential between the first photocathode screen 24 and the first display screen 26 is $-20$ Kv or approximately 80% of the potential ($-30$ Kv) between the second photocathode 32 and the second display screen 34. The first display screen and the second photocathode are connected together to have the same potential with respect to the second display screen 34.

In operation, the electron pattern on the negatively charged first photocathode screen 24 is accelerated towards the first, positively charged (relative to the photocathode screen 24), display screen 26 by means of the electrostatic potential supplied by the high voltage source 38 connected between the display screen 26 and the photocathode screen 24. The electrons striking the display screen 26 produce a corresponding light image (i.e. photons are emitted in a corresponding pattern) which passes through the fiberoptic plate 28 to impinge on the second photocathode 32. The photocathode 32 then reemits a corresponding pattern of electrons which are accelerated toward the display screen 34 to produce an output light image which is viewable through the window 36.

Although the display screen 34 is positive with respect to the photocathode screen 32, it is at a neutral potential with respect to the remaining elements of the tube, including the metallic envelope 12, to thereby reduce distortion due to field emission.

It should be noted that substantially no focusing takes place in the tube as opposed to prior art, non-proximity type tubes. The scintillator screen 22, the photocathode screens 24, 32 and the display screens 26 and 34 are parallel to each other. In contrast to the applicant's single stage proximity image intensifier tube described in U.S. Pat. No. 4,140,900, the gap spacing between the photocathodes and the phosphor screens are relatively short. The spacing between the first photocathode screen 24 and the first display screen 26 is preferably 10 mm and the spacing between the second photocathode 32 and the second display screen 34 is preferably 15 mm. In other embodiments these spacings could range between 5 to 15 mm and 10 to 25 mm, respectively. In the single stage tube described in the above mentioned patent, the photocathode to display screen spacing is much larger (20 mm) for high gain 3,000–5,000 cd-sec/$M^2$-R tubes.

Furthermore, the applied voltages across the first and second stage gaps between photocathode layers and the display screens are 20,000 and 30,000 volts, respectively, which are each lower than in the single stage tube described in the patent. The voltage applied in high gain single stage tubes is between 30–40 Kv. Thus, the voltage per unit of distance, i.e., the field strengths of the two stage tube according to the invention are 2 Kv/mm (first stage) and 2 Kv/mm (second stage).

By keeping the photocathode to phosphor screen spacing and the field strength within the above mentioned limits the two stage image intensifier tube is not only able to achieve high gain at the same over-all operating voltage (see FIG. 5), on the order of 30,000–50,000 cd-sec/$M^2$-R, but is also able to do this with a higher resolution and contrast ratio than the highest gain (3,000–5,000 cd-sec/$M^2$-R) single stage proximity type tubes. This is because the effects of the dispersion of the electrons at the first photocathode (due to the uneven, scintillator undersurface) are minimized by the shorter photocathode to phosphor screen gap.

Also the various feedback mechanisms, such as ions and x-rays generated at the output display screen are either eliminated or greatly diminished in their effect. The lower voltage per stage and shorter gap reduces the velocity and disperson of the electrons striking the display screen and therefore reduces or eliminates the number of ions and x-rays which would be generated by higher velocity electrons striking the display screen. Also the fiberoptic plate 28, the photocathode 32 and the phosphor screen 26 help prevent such spurious x-rays and ions from reaching the scintillation screen 22 where they would otherwise produce signal "noise".

The scintillation screen 22 can be calcium tungstate ($CaWO_4$) or sodium activated cesium iodide (CsI(NA)) or any other type of suitable scintillator material such as NaI(Tl). However, vapor deposited, mosaic grown scintillator layers are preferred for the highly desired smoothness and cleanliness. Since such materials and their methods of application are well known to those skilled in the art, see for example, U.S. Pat. No. 3,825,763, they will not be described in greater detail.

The overall thickness of the scintillator screen 22 is chosen to be 50 to 600 microns thick to give a higher x-ray photon utilization ability than prior art devices, thereby allowing overall lower patient x-ray dosage levels without a noticeable loss of quality as compared to prior art devices. This is because the format of the tube and the absence of several sources of "unsharpness" gives an extra margin of sharpness to the image which can be traded off in favor of lower patient dosage levels with greater x-ray stopping power at the scintillator screen 22.

Similarly, the first and second photocathode layers 24 and 32 are also of a material well known to those skilled in the art, being cesium and antimony ($Cs_3Sb$) (industry photocathode types S-9 or S-11) or multi-alkali metal (combinations of cesium, potassium and sodium) and antimony.

The image produced on the output phosphor screen 34 is the same size as the input x-ray image. Both of the phosphor screens 26 and 34 can be of the well known zinc-cadmium sulfide type (ZnCds(Ag)) or zinc sulfide type (ZnS(Ag)) or a rare earth material like yttrium oxsulfide type ($Y_2O_2S$(Tb) or any other suitable high efficiency blue and/or green emitting phosphor material.

Figure 3:
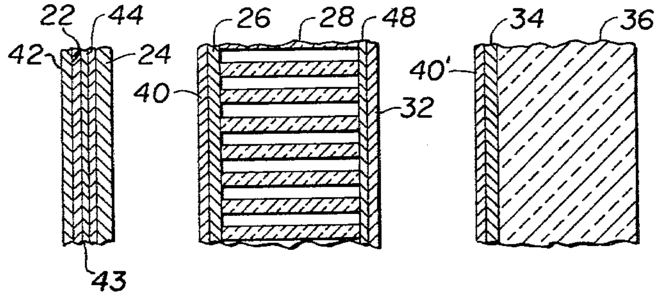
FIG. 3 is an enlarged, vertical, sectional view of a portion of the image intensifier tube depicted in FIG. 2.
Figure 4:
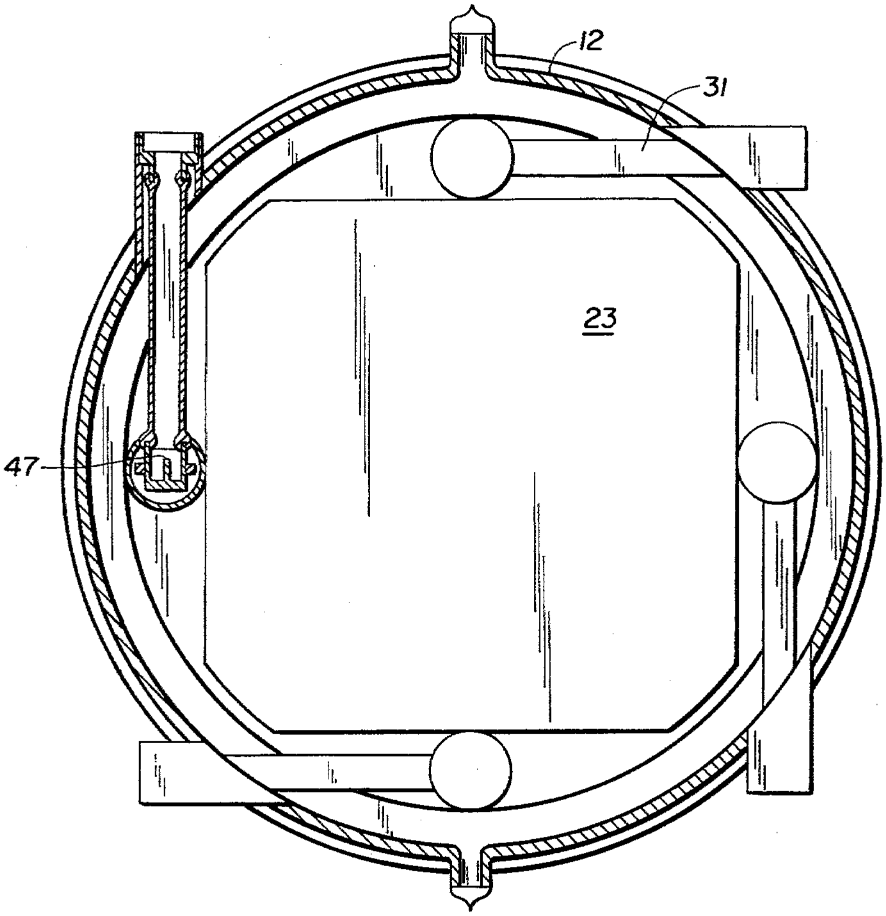
FIG. 4 is a vertical, sectional view, taken generally along the lines 4—4 in FIG. 2.

Referring to FIG. 3, the interiorly facing surfaces of the display screens 26 and 34 are covered with a metallic aluminum film 40 and 40' in the standard manner. The phosphor layer constituting the screen 34 is deposited on a high Z glass output window 36. By high Z is meant that the window glass has a high concentration of barium or lead to reduce x-ray back scatter inside and outside the tube and to shield the radiologist from both primary and scattered radiation.

Referring again more particularly to FIG. 3, in an enlarged cross-sectional view, the details of the scintillation and photocathode screen assembly 23 and the fiberoptic plate 28 are illustrated. The screen assembly 23 comprises the scintillator layer 22 of very smooth calcium tungstate, thalluim activated sodium iodide or sodium activated cesium iodide which is vapor deposited on a smoothly polished nickel plated aluminum substrate or an anodized aluminum substrate 42 which faces the input window 14. The techniques of such vapor deposition processes are known to those skilled in the art, see for example, U.S. Pat. No. 3,825,763. For direct viewing purposes, the layer 22 is between 200 to 600 microns thick. For radiographic purposes, the layer 22 could be thinner (50–200 $\mu$), i.e., the image could be less bright.

As mentioned above, the purpose of the scintillator screen 22 is to convert the x-ray image into a light image. On the surface of the scintillation layer 22 which faces away from the substrate 42, a thin, conductive, transparent electrode layer 44 such as a vapor deposited metallic foil, i.e., titanium or nickel, is deposited and on top of this is deposited the first photocathode 24. In some embodiments a barrier layer 43 is interposed between the scintillator crystal 22 and the photocathode 24. The barrier layer 43 is transparent and has an index of refraction which matches the index of refraction of the scintillator crystal. The barrier layer is made up of material selected from the group consisting essentially of thin layers of freshly vapor deposited CsI(Na), CsI, or layers of bismuth germanate or $Al_2O_3$. The first photocathode layer 24 converts the light image from the scintillator layer 22 into an electron pattern image and the free electrons from the first photocathode 24 are accelerated by means of the high voltage potential 38 toward the first display screen 26, all as mentioned above. The planar surface of the fiberoptic plate 28 which faces toward the output window 36 is covered with a thin, conductive transparent electrode layer 48 such as vapor deposited metallic foil, i.e. titanium or nickel. The second photocathode layer 32 is then deposited on top of this layer. The scintillator photocathode screen 23 in this invention is suspended from the tube envelope 12 between the input window 14 and the fiberoptic plate 28 by several insulating posts 31. One or more of these posts may be hollow in the center to allow a high voltage cable 47 from the source 38 to be inserted to provide the scintillator photocathode screen 23 at the layer 44 with a negative high potential. Similarly the electrodes 30 contain a high voltage cable 46 to connect the display screen 26 and the electrode 48 to the high voltage supply 38.

The remaining parts of the intensification tube including the metallic envelope 12, are all operated at ground potential. This concept of minimizing the surface area which is negative with respect to the output screen results in reduced field emission rate inside the tube and allows the tube to be operable at higher voltages and thus higher brightness gain. It also minimizes the danger of electrical shock to the patient or workers if one should somehow come in contact with the exterior envelope of the tube.

To reduce charges accumulated on the insulating posts 30, 31 they are coated with a slightly conductive material such as chrome oxide which bleeds off the accumulated charge by providing a leakage path.

The essentially all metallic and rugged construction of the tube minimizes the danger of implosion. The small vacuum space enclosed by the tube represents much smaller stored potential energy as compared with a conventional tube which further minimizes implosion danger. Furthermore, if punctured, the metal behaves differently from glass and the air supply leaks in without fracturing or imploding.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

Further advantage could be obtained with 3-stage in cases where both high gain and higher resolution is needed. Additional stages, such as 3 or more are obvious extensions of this invention.

What is claimed is:

1. An x-ray sensitive image intensifier tube characterized by a flat scintillator screen for converting impinging x-rays into a corresponding light spot pattern, a flat output display screen, and multi-stage light amplification means intermediate the scintillator screen and the output display screen, the multi-stage light amplification means including at least a first flat photocathode disposed with its flat surfaces parallel to and adjacent to the scintillator screen, an intermediate flat phosphor display screen, the display screen having its flat surfaces parallel to and spaced apart from the flat surfaces of the first photocathode and on its side opposite from the scintillator screen, a fiberoptic plate, a second photocathode, the first and second photocathodes producing a pattern of photoelectrons corresponding to the light spot pattern, and wherein the intermediate display screen is mounted on one side of the fiberoptic plate and the second photocathode is mounted on the other side of the fiberoptic plate, the output display screen being spaced apart from the second photocathode and plane parallel to it, an output window on which the output display screen is mounted, a metallic input window, means for applying an accelerating electrostatic potential between the intermediate display screen and the first photocathode and for applying an accelerating electrostatic potential between the second photocathode and the output display screen, an open ended, hollow, evacuated envelope surrounding the scintillator screen, the fiberoptic plate, the first and second photocathodes, the intermediate and output display screens and which is closed at one end by the output window and at the other end by the input window and wherein the scintillator screen, the first and second photocathodes and the first and second display screens all have diagonal dimensions at least equal to the actual size of the x-ray image to be intensified, and means for applying separate electrostatic potentials solely between the first and second display screens on the one hand and the first and second photocathodes on the other hand to accelerate the photoelectrons produced at the photocathodes toward the display screens along essentially parallel, straight trajectories to impinge upon the display screen.

2. An x-ray sensitive image intensifier tube as recited in claim 1 wherein the envelope is metal and the electrostatic potential means supply high negative potentials to the scintillator screen and the first and second photocathodes and a ground potential to the output display screen and the envelope.

3. An x-ray sensitive image intensifier tube as recited in claim 1 wherein the scintillation screen, the first and second photocathodes and the intermediate and output display screens have substantially the same diagonal dimensions.

4. An x-ray sensitive image intensifier tube as recited in claim 1 wherein the input window is concave inwardly with respect to the tube envelope and is made from type 17-7 PH stainless steel.

5. An x-ray sensitive image intensifier tube as recited in claim 1 wherein the scintillator screen is a scintillator crystal and further comprising a thin layer of light transmitting material interposed between the photocathode and the scintillator crystal which material has an index of refraction which matches the index of refraction of the scintillator crystal.

6. An x-ray sensitive image intensifier tube as recited in claim 5 wherein the thin layer is comprised of freshly vapor deposited CsI.

7. An x-ray sensitive image intensifier tube as recited in claim 5 wherein the thin layer is comprised of freshly vapor deposited CsI(Na).

8. An x-ray sensitive image intensifier tube as recited in claim 1 wherein the scintillator screen is a scintillator crystal selected from the group consisting essentially of CsI(Na) or NaI(Tl) and further comprising a barrier layer interposed between the scintillator crystal and the photocathode, the barrier layer being transparent and having an index of refraction which matches the index of refraction of the scintillator crystal.

9. An x-ray sensitive image intensifier tube as recited in claim 8 wherein the barrier layer is made of a material selected from the group consisting essentially of CsI(Na), CsI, bismuth germanate or $Al_2O_3$.

10. An x-ray sensitive image intensifier tube as recited in claim 1 wherein the spacing between the first photocathode and the first display screen is 5 to 15 mm and the spacing between the second photocathode and the second display screen is 10 mm to 25 mm.

11. An x-ray sensitive image intensifier tube as recited in claims 2 or 10 wherein the electrostatic potential means applies an electrostatic potential of 10 to 30 thousand volts between the first photocathode and the first display screen and 20 to 40 thousand volts between the second photocathode and the second display screen.

12. A multi-stage, proximity type, x-ray sensitive image intensifier tube comprising a tube envelope, a metallic input window in the tube envelope, a flat, halide activated, alkali halide scintillator screen adjacent the input window for converting the x-ray image into a light pattern image, a first flat photocathode layer parallel and immediately adjacent to the scintillator screen for emitting photoelectrons in a pattern corresponding to the light pattern image, a first flat, phosphor display screen parallel to and spaced apart from the first photocathode layer with the space between them being an uninterrupted vacuum, a second photocathode layer, passive means for conducting light along a plurality of parallel channels, the light conducting means including a channeled, light conducting, two sided plate, the first display screen being mounted on one side of this plate and the second photocathode layer being mounted on the other side of the plate, a second phosphor display screen, an output window in the tube envelope on which the second display screen is mounted spaced apart from the second photocathode layer and plane parallel to it, the scintillator screen, the first and second photocathode layers and the first and second display screens all having diagonal dimensions at least equal to the actual size of the x-ray image to be intensified, and means for applying separate electrostatic potentials solely between the first and second display screens on the one hand and the first and second photocathode layers on the other hand to accelerate the pattern of photoelectrons toward the display screens along parallel, straight trajectories to impinge upon the display screens.

* * * * *